(12) United States Patent
Merfels et al.

(10) Patent No.: US 11,041,729 B2
(45) Date of Patent: Jun. 22, 2021

(54) METHOD AND SYSTEM FOR DETERMINING A GLOBAL POSITION OF A FIRST LANDMARK

(71) Applicant: Volkswagen Aktiengesellschaft, Wolfsburg (DE)

(72) Inventors: Christian Merfels, Braunschweig (DE); Ugur Kekec, Hannover (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 174 days.

(21) Appl. No.: 16/092,551

(22) PCT Filed: Mar. 17, 2017

(86) PCT No.: PCT/EP2017/056380
§ 371 (c)(1),
(2) Date: Oct. 10, 2018

(87) PCT Pub. No.: WO2017/178190
PCT Pub. Date: Oct. 19, 2017

(65) Prior Publication Data
US 2019/0128678 A1 May 2, 2019

(30) Foreign Application Priority Data
Apr. 11, 2016 (DE) .................... 10 2016 205 964.5

(51) Int. Cl.
*G01C 21/32* (2006.01)
*G05D 1/02* (2020.01)
(Continued)

(52) U.S. Cl.
CPC .............. *G01C 21/32* (2013.01); *G01S 19/48* (2013.01); *G05D 1/0274* (2013.01); *G06F 16/29* (2019.01); *G05D 2201/0213* (2013.01)

(58) Field of Classification Search
CPC ......... G01C 21/32; G06F 16/29; G06F 17/00; G01S 19/48; G05D 1/0274; G05D 2201/0213; G06T 17/00
(Continued)

(56) References Cited

U.S. PATENT DOCUMENTS 7,933,433 B2    4/2011  Ogawa ........................ 382/104
9,140,792 B2    9/2015  Zeng
(Continued)

FOREIGN PATENT DOCUMENTS

DE    102004003850 A1    8/2005    ............... E01F 9/08
DE    102007020791 A1    11/2007   ............... G06K 9/62
(Continued)

OTHER PUBLICATIONS

International Search Report and Written Opinion, Application No. PCT/EP2017/056380, 10 pages, dated Jun 9, 2017.

*Primary Examiner* — Mahmoud S Ismail
(74) *Attorney, Agent, or Firm* — Slayden Grubert Beard PLLC (57) ABSTRACT

A method for determining a global position of a first landmark is provided, wherein at least one first and one second measurement data set are recorded. A first reference point and a first recording space are assigned to the first measurement data set, and a second reference point and a second recording space are assigned to the second measurement data set. A spatial correlation of the first and second landmark relative to each other is determined using the first measurement data set. The global position of the first landmark relative to a global reference point is determined by determining a first and second relative position of the first landmark, by determining a first relative position of the second landmark, and by using the determined spatial correlation.

14 Claims, 5 Drawing Sheets

(51) Int. Cl.
  *G06F 16/29* (2019.01)
  *G01S 19/48* (2010.01)
  *G06F 17/10* (2006.01)
  *G06G 7/78* (2006.01)
  *G06T 17/00* (2006.01)

(58) Field of Classification Search
  USPC .................................. 701/446, 300; 345/420
  See application file for complete search history.

(56) References Cited

U.S. PATENT DOCUMENTS

2010/0091017 A1* 4/2010 Kmiecik ............... G06T 3/4038
  345/420
2012/0310516 A1* 12/2012 Zeng ....................... G01S 19/46
  701/300

FOREIGN PATENT DOCUMENTS

| DE | 102012208974 A1 | 12/2012 | ............ G01C 21/26 |
| EP | 2074379 B1 | 2/1916 | ............ G01C 11/02 |
| EP | 2793041 A1 | 10/2014 | ............ G01S 1/06 |
| WO | 2017/178190 A1 | 10/1917 | ............ G01C 21/32 |
| WO | 2007/017693 A1 | 2/2007 | ............ B60W 40/02 |

* cited by examiner

METHOD AND SYSTEM FOR DETERMINING A GLOBAL POSITION OF A FIRST LANDMARK

CROSS-REFERENCE TO RELATED APPLICATIONS

This application claims priority to German Application No. 10 2016 205 964.5, filed on Apr. 11, 2016 with the German Patent and Trademark Office, the contents of which application are hereby incorporated by reference in their entireties.

TECHNICAL FIELD

The present invention relates to a method and a system for determining a global position of a first landmark.

The automated guidance of a vehicle presumes that the position of the vehicle is precisely known in every situation, wherein in particular, a precision within the decimeter or centimeter range is needed. Typically, this precision is not achieved by standard installed, satellite-supported positioning methods (such as GPS), and positioning using these methods frequently causes jerky system behavior. To locate the vehicle, map-supported methods can therefore be used in which the current sensor data of the vehicle is compared with known map data. Since the map data for example comprises the precise positions of landmarks, the vehicle can record landmarks in its surroundings, and the current position of the vehicle can be determined very precisely by a comparison of the sensor data with the map data.

When recording the map data with the landmarks, for example by means of a reference vehicle, the landmarks can be recognized using reference vehicle sensors and located with a definite precision. Their positions in the map coordinate system are determined by repeatedly observing and offsetting measuring errors. When, after mapping, a vehicle drives by a position for which a map with landmarks exists, the position of the vehicle can be determined relative to the landmarks. The precision of the landmark maps is therefore very important for the precision of locating a vehicle based thereupon.

In mapping landmarks, in particular the position of the reference vehicle can be assumed to be known ("mapping with known poses") if a sufficiently precise reference positioning system is provided therein by means of which the actual position of the reference vehicle at a specific point in time of the mapping process can be determined with sufficient precision, for example by reprocessing data from a satellite system. Each recorded position of a landmark is then linked to the previously determined positions. To compensate for uncertainties in determining the position of the landmarks, a curve fit calculation is employed using the method of the least square. In this manner, the positions of the landmarks within the map coordinate system are determined.

BACKGROUND

In the method proposed in DE 10 2004 003 850 A1 for identifying marks on a road, a plurality of distance-measuring images are recorded by a laser scanner in a recording space over time, wherein the recording space intersects the road surface. The position and the shape of recognized markers are estimated. In particular, road markers are recognized.

DE 10 2007 020 791 A1 describes a recognition device for lane markers with which data are recorded by means of a LiDAR instrument. Data on the lane are periodically extracted based on a midline position, a midline shape, and a lane width. Furthermore, a tracking of the recognized lane is described in a curve.

SUMMARY

An object thus exists to provide a method and a system that enable an enhancement of the precision of a landmark map, wherein the landmark map is in particular generated using data from a reference vehicle.

The object is solved according to the invention by a method with the features of claim 1 and a system with the features of the corresponding apparatus claim. Some embodiments will become apparent from the dependent claims.

In a first aspect, a method for determining a global position of a first landmark is provided. Herein, at least one first and one second measurement data set are recorded, wherein a first reference point and a first recording space are assigned to the first measurement data set, and a second reference point and a second recording space are assigned to the second measurement data set, the first landmark is detected in the first and second recording space, and a second landmark is detected in the first recording space, by using the first measurement data set, first relative positions of the first and the second landmark are determined relative to the reference point of the first recording space, and by using the second measurement data set, a second relative position of the first landmark is determined relative to the reference point of the second recording space, spatial correlation of the first and second landmark relative to each other is determined using the first measurement data set, and the global position of the first landmark relative to a global reference point is determined by using the determined first and second relative position of the first landmark, by using the determined first relative position of the second landmark, and by using the determined spatial correlation.

BRIEF DESCRIPTION OF THE DRAWINGS

The invention is explained in the following using exemplary embodiments.

In a method according to a first aspect for determining a global position of a first landmark, at least one first and one second measurement data set are recorded. A first reference point and a first recording space are assigned to the first measurement data set, and a second reference point and a second recording space are assigned to the second measurement data set. The first landmark is detected in the first and second recording space. Furthermore, a second landmark is detected in the first recording space. By using the first measurement data set, first relative positions of the first and second landmark are determined relative to the reference point of the first recording space, and by using the second measurement data set, a second relative position of the first landmark is determined relative to the reference point of the second recording space. With the help of the first measurement data set, a spatial correlation of the first and second landmark relative to each other will then be determined The global position of the first landmark relative to a global reference point may in some embodiments be determined by using the determined first and second relative position of the first landmark, by using the determined first relative position of the second landmark, and by using the determined spatial correlation.

The global position of the first landmark may be determined thereby with very high precision, and measuring errors may be corrected easily.

The present explanation is based on the fact that not only is the position of a certain landmark repeatedly determined in order to then determine an optimized position of this landmark with a reduced measuring error, for example using an average or the method of the least square. Instead, the relative positions of a plurality of landmarks to each other are also taken into account as constraints in the optimization. These constraints require in particular that the relative position and structure of a plurality of landmarks to each other are retained in the resulting landmark map.

With known systems, a landmark is typically recorded and located repeatedly, and the plurality of measurements of this individual landmark is used to determine the precise position independent of other landmarks. For example, a plurality of images are recorded, and a relative position of a certain landmark is determined using the images, i.e., a position relative to the reference point determined with a certain uncertainty for the respective image. Then the global position of the landmark is determined in a landmark map using the plurality of reference positions.

The method according to the present aspect improves this method in that the relative position of a landmark to other landmarks which were also detected is taken into account. Whereas namely the global position of a landmark in the map coordinate system can typically be recorded with greater imprecision, the relative positions of the detected landmarks to each other can be determined with better position. By combining these data, a greater number of conditions results overall for determining the global position, and therefore a significant increase in precision.

According to the present aspect, a "measurement data set" designates a totality of data that enable recording and locating objects, in particular landmarks.

The terms "first measurement data set" and "second measurement data set" refer to at least two different measurement data sets. These may, but however do not have to be, recorded in a sequence over time or in a specific spatial relationship. In particular, the first measurement data set can be recorded before the second, or the second can be recorded before the first. The only prerequisite is that the recording spaces in which the measurement data sets are recorded overlap. Moreover, the first landmark is recorded in the overlapping region so that redundant data exist for this landmark. In particular, more than the aforementioned two landmarks can be recorded, and a plurality of landmarks can be repeatedly recorded in the overlapping region.

"Landmarks" within the meaning of the present aspect designate in particular objects that are present over the long term at a geographic position and that have certain unchanging characteristics. The landmarks can in particular be used as orientation points.

In some embodiments of the method according to the present aspect, the landmarks comprise a road marker, a post, and/or an edge. Relevant and permanent features of roads are thereby taken into account which are present on typical traveled routes such as streets and avenues.

An edge can for example be detected at a building in the surroundings of the route. Objects with an elongated extension in the direction vertical to the Earth's surface are understood as posts in the broadest sense. For example guideposts along a street, street lanterns, bridge posts, traffic light posts or the posts of traffic signs can be recognized as posts. Posts typically have features as orientation points, for example when they overtop obstacles due to their greater height, when they are recordable from a distance, or when they are easily recognizable and precisely locatable due to clearly defined outlines. An advantage of road markers is that they are generally easily recordable on the lane, at least in a region directly around the vehicle, when they are not covered by an object such as snow or a dirt layer.

The aforementioned examples also have the feature beneficial to landmarks that they are standardized to a certain extent and therefore facilitate recognition. For example in most countries, there are traffic regulations on the shape and arrangement of road markers, posts and other objects in the region of a route. Lines on the road, for example as a border for a lane, typically have a clear orientation due to their shape, such as elongated in the direction of the longitudinal extension of the road.

According to the present aspect, the reference positions are determined using the same measurement data sets as when determining the spatial correlation. A separate step is therefore unnecessary for recording the spatial correlations of the landmarks relative to each other. This is a major advantage of the setup according to the present aspect relative to known methods.

In some embodiments, a point in time is assigned to each measurement data set. This ensures that the data of a measurement data set were basically recorded simultaneously or can be considered as being simultaneously recorded. In particular, the data for the spatial correlation and for determining the reference positions are thereby recorded simultaneously.

This is particularly beneficial when the spatial correlation of landmarks is determined using the measurement data set. For example, how a plurality of landmarks are arranged relative to each other can be determined using a camera image. If the data are assigned to a specific point in time, it can be assumed that the spatial correlation is consistent with reality without for example a change of the coordinate system of the recorded data which results from a movement of the recording camera distorting the spatial correlation. If applicable, the recorded measurement data sets may in some embodiments be preprocessed in order to avoid artifacts such as recording during a simultaneous movement of the sensors.

In some embodiments, a plurality of measurement data sets is recorded sequentially over time, wherein the recording spaces assigned to the measurement data sets are shifted relative to each other along a trajectory. This makes it possible to use a reference vehicle for the stepwise recording of the data to create a map with landmarks during a measuring trip.

In this case, the frequency of recording measurement data sets while the reference vehicle is moving along the trajectory at a certain speed can be selected or adapted such that the recording spaces have a sufficiently large overlap and landmarks are recorded in an overlapping region with a high probability. In this manner, a large number of conditions for precisely determining the global positions of the landmarks can be recorded.

In some embodiments, the measurement data sets comprise distance information and/or image data. Because of that the landmarks can thereby be easily recognized and located.

For example, the measurement data sets can be recorded with a monocamera, a time-of-flight camera, a stereo camera, a light detection and ranging (lidar) device, and/or a radio detection and ranging (radar) device. In particular, a combination of a plurality of methods enables specifically effective recording.

In some embodiments, the reference points of the measurement data sets are recorded by means of a satellite-supported positioning method. Thereby known methods may be linked to the setup of the present aspect.

In particular, by means of the satellite-supported positioning method, the position of a reference vehicle can be recorded at the point at which it has recorded a measurement data set. This geographic position can serve as a reference point relative to which the relative positions of the landmarks detected in the measurement data set are determined. When combining the data according to the present aspect to determine the global positions of the landmarks, imprecisions in the recording of the reference points can be compensated.

In some embodiments of the method, the global reference point is a position of a location on the Earth's surface. The determined global positions of the landmarks can thereby be provided for later use, for example in a database, by means of which a vehicle can determine its own position within a geographic coordinate system on the Earth's surface when later recording landmarks.

In some embodiments, map data are generated or updated using the determined global position. This allows to create a map with the global positions of the landmarks.

In some embodiments, the determined spatial correlation comprises a distance and/or an angle. The spatial arrangement of the landmarks relative to each other is thereby clearly characterized. In particular, the spatial correlation can be determined as a vector between the determined relative positions of the landmarks. In the method according to present aspect, the global positions are then determined such that this vector of the spatial correlation is retained or is only changed under specific conditions and in a specific way.

In some embodiments, the global position of the first landmark is determined by means of a curve fit calculation. This makes it possible to use known calculating methods for determining the precise global positions of landmarks.

In a curve fit calculation like known in geodesy, data from a network are for example optimized with a plurality of landmarks at determined positions depending on specific constraints.

In some embodiments, the determined spatial correlation is used as a basic condition for the curve fit calculation.

Furthermore, in some embodiments, a second global position is determined for the second landmark by means of the curve fit calculation. By introducing additional basic conditions according to the method of the present aspect, the result of the curve fit calculation is improved. At the same time, the recording of the constraints using simultaneously recorded landmarks is facilitated and improved.

In a second aspect, the aforementioned system comprises a recording unit, by means of which at least one first and one second measurement data set can be recorded. In so doing, a first reference point and a first recording space are assigned to the first measurement data set, and a second reference point and a second recording space are assigned to the second measurement data set. It furthermore comprises a detection unit by means of which the first landmark in the first and second recording space, as well as a second landmark in the first recording space, is detectable. It furthermore comprises a computing unit by means of which, by using the first measurement data set, first relative positions of the first and the second landmark can be determined relative to the reference point of the first recording space, and by using the second measurement data set, a second relative position of the first landmark can be determined relative to the reference point of the second recording space.

It moreover comprises a correlation unit by means of which a spatial correlation of the first and second landmark to each other can be determined using the first measurement data set. Finally, it also comprises an adjustment unit by means of which the global position of the first landmark relative to a global reference point can be determined by using the determined first and second relative position of the first landmark, by using the determined first relative position of the second landmark, and by using the determined spatial correlation.

The system according to the present aspect is in particular designed to implement the above-described method according to the first aspect. The system accordingly has the same advantages as the method according to the first aspect.

In some embodiments of the method, the recording unit comprises a monocamera, a time-of-flight camera, a stereo camera, a lidar device and/or a radar device. Therefore structures can be recorded by means of different methods. In particular, combinations of different sensors and sensor types can be used. In particular, monocameras are already very widespread and can be provided economically.

In some embodiments, the system is comprised by a vehicle, wherein furthermore, a position of the vehicle can be recorded for each measurement data set, and the respective recorded position of the vehicle is assigned to the respective measurement data set as a reference point. The reference point is thereby recorded by the vehicle itself, for example by means of a satellite-assisted positioning system.

The invention will now be explained using exemplary embodiments with reference to the drawings.

With respect to FIG. 1, a vehicle will be explained according to an exemplary embodiment.

A vehicle 1 is driving on a road 10. The vehicle 1 comprises a recording unit 2 and a computing unit 4 coupled thereto. The computing unit 4 itself comprises a detection unit 3, a correlation unit 5 and an adjustment unit 6.

Furthermore, a recording space 20*a* of the recording unit 2 is indicated which is substantially constant relative to the recording unit 2 and the vehicle 1 and moves with the vehicle 1 on the road 10. Landmarks in the surroundings of the vehicle 1 are of particular importance. In the depicted example, guideposts 8 are arranged at the edge of the road 10, and road markers 7 are applied approximately in the middle of the road 10. Part of these landmarks are located in the recording space 20*a* in the depicted instance.

With respect to FIG. 2A to 2E, an exemplary embodiment of a method will be explained using spatial correlations between landmarks on a road depicted as an example. In so doing, the exemplary embodiment of the system explained above with reference to FIG. 1 will be assumed as a basis.

Figure 2A:
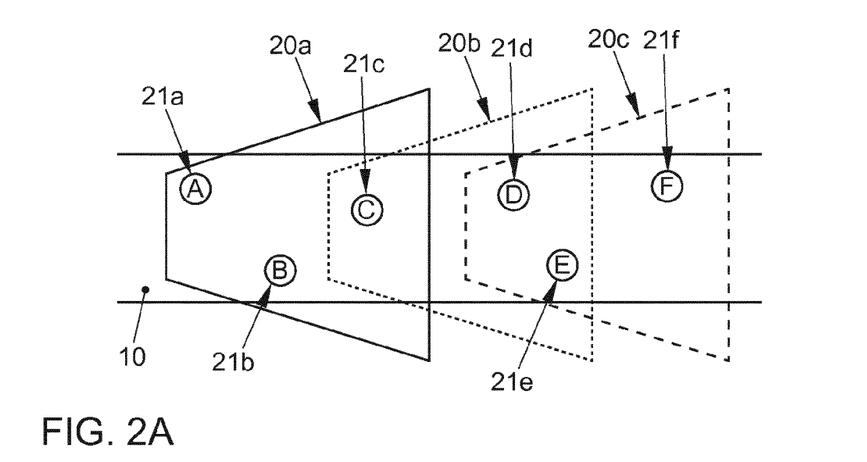
FIG. 2A to 2E show, as an example, spatial correlations between landmarks on a road.

FIG. 2A shows the road 10 on which the landmarks 21*a*, 21*b*, 21*c*, 21*d*, 21*e*, 21*f* are arranged. These can for example be road markers 7. The vehicle 1 moves along the road 10 and records measurement data sets at three sequential points in time during the trip on the road 10, in particular by means of a time-of-flight (ToF) camera. In so doing, the measurement data sets comprise in particular image data and distance data, for example for each pixel of the image data. Distance- and spatially-resolved images are thus recorded in the recording spaces 20a, 20b, 20c. The time of their recording is assigned to each of the measurement data sets recorded in this manner. In so doing, the points in time of the recording of the measurement data sets and the speed of movement of the vehicle 1 are harmonized with each other such that the recording spaces 20a, 20b, 20c have a certain overlap such that the recording spaces 20a, 20b, 20c of at least two sequential measurement data sets comprise certain regions of the road surface.

For each measurement data set, i.e., for example for each recorded image of the ToF camera, a reference position is determined for the respective point in time. This reference position can in particular correspond to a current global geographic position of the vehicle 1 that is determined for example using data from a GPS module (not shown) of the recording unit 2. For example, it is thus taken into account that the vehicle 1 and accordingly the recording spaces 20a, 20b, 20c have moved between the recording of two measurement data sets.

With reference to the measurement data sets recorded for the recording spaces 20a, 20b, 20c, the landmarks 21a, 21b, 21c, 21d, 21e, 21f are recognized by means of the detection unit 3, and their relative position relative to the respective reference point of the measurement data set is determined by means of the computing unit 4. For example, by calibrating the camera, a position relative to the vehicle can be assigned to a determined position in the recorded image. By using the reference position determined for the vehicle 1 at this point in time, the relative position of the recognized landmarks 21a, 21b, 21c, 21d, 21e, 21f can then be determined.

The precision of this determined relative position in comparison to the real geographic position of the landmarks 21a, 21b, 21c, 21d, 21e, 21f on the road surface depends in particular on the precision in determining the reference point, in this case, the position of the vehicle 1, as well as the precision in determining the position relative to the vehicle 1. In the cases depicted in FIG. 2B to 2D, the ideal is assumed that the landmarks 21a, 21b, 21c, 21d, 21e, 21f are located precisely at their actual global position on the road surface. Deviations from this ideal and the use of the method according to the present discussion to correct the errors arising in this manner will be explained in greater detail below.

Figure 2B:
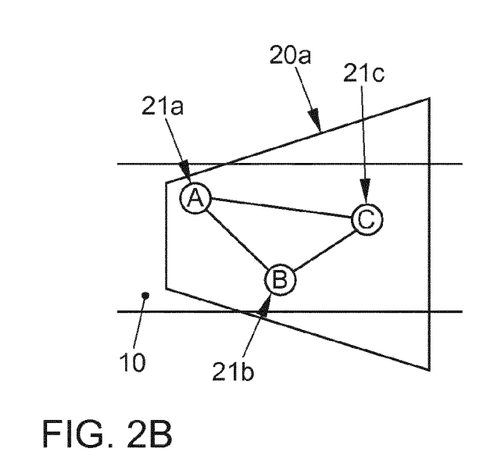
Figure 2C:
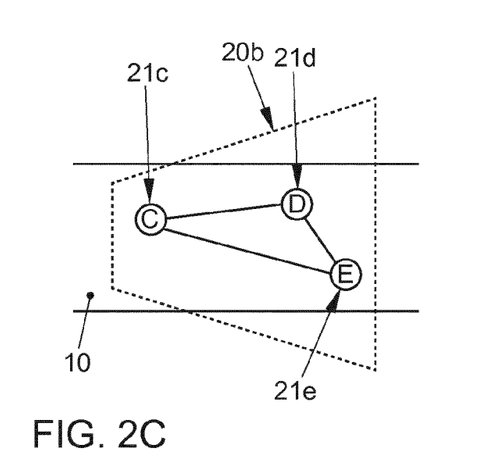
Figure 2D:
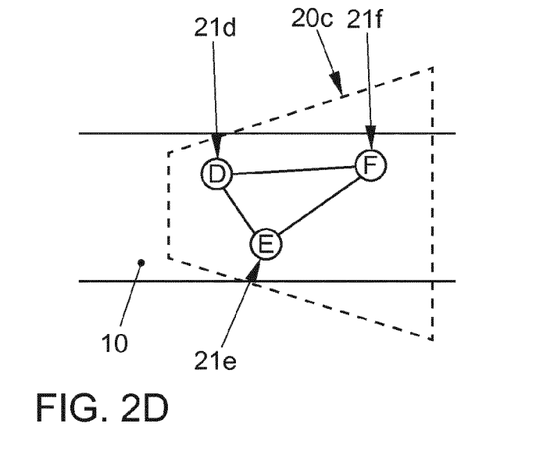

FIG. 2B to 2D show which landmarks 21a, 21b, 21c, 21d, 21e, 21f are located in which recording space 20a, 20b, 20c. For example, the landmarks "A", "B" and "C" (21a, 21b, 21c) are recorded in a recording space 20a. The landmark "C" 21c is also recorded in the recording space 20b depicted in FIG. 2C. Accordingly, two measurements of the position of the landmark "C" 21c can be made in the example.

Furthermore, spatial correlations of the landmarks 21a, 21b, 21c are determined by means of the correlation unit 5 and are indicated by connecting lines between the landmarks 21a, 21b, 21c. Particularly in doing so, the distances that the landmarks 21a, 21b, 21c have to each other is determined, along with the angle at which the virtual connecting lines run relative to each other. This can be determined in a very easy manner on the road surface, which can be assumed to be substantially two-dimensional; however, the method according to the present discussion also permits an expansion to three-dimensional space, for example to determine a spatial correlation between a road marker and a stoplight at a certain height above the road 10.

Figure 2E:
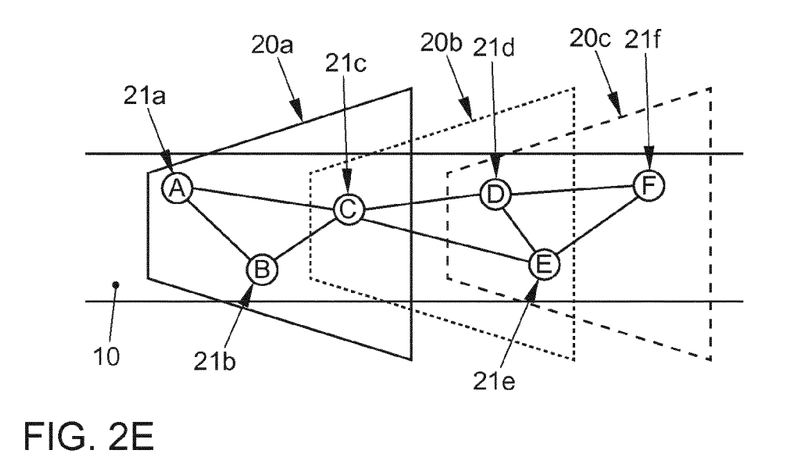

With the assistance of the spatial correlations together with the overlap of the recording spaces 20a, 20b, 20c, it is possible to combine a plurality of measurement data sets as they are schematically depicted in FIGS. 2B, 2C and 2D. Such a combination is shown in FIG. 2E. This can be done in particular using the adjustment unit 6; as described below, the combination in this case is very easy for the depicted idealized case.

In this case, pseudo-observations can now also be determined, i.e., spatial correlations between landmarks 21a, 21b, 21c, 21d, 21e, 21f can be determined that were not recorded together in a measurement data set. For example, the data shown in FIG. 2E permit the statements on the spatial correlation between the landmarks "A", "D" and "F", even though these were not jointly recorded in the first recording space 20a (see FIG. 2B) or in the third recording space 20c (see FIG. 2D).

This defines a large number of secondary conditions, wherein it is assumed that the spatial correlations determined in this manner are to be reproduced by a landmark map generated using the measurement data sets. In this case, it can in particular be assumed that the spatial correlations can be determined with very high precision using the measurement data sets, for example using images from a camera. In particular, this precision can be much better than the precision of determining the reference position, or respectively the position of the vehicle 1.

With respect to FIG. 3A to 3D, an exemplary embodiment with recorded relative positions of landmarks that were determined in an exemplary embodiment of the discussed method will be explained.

Figure 1:
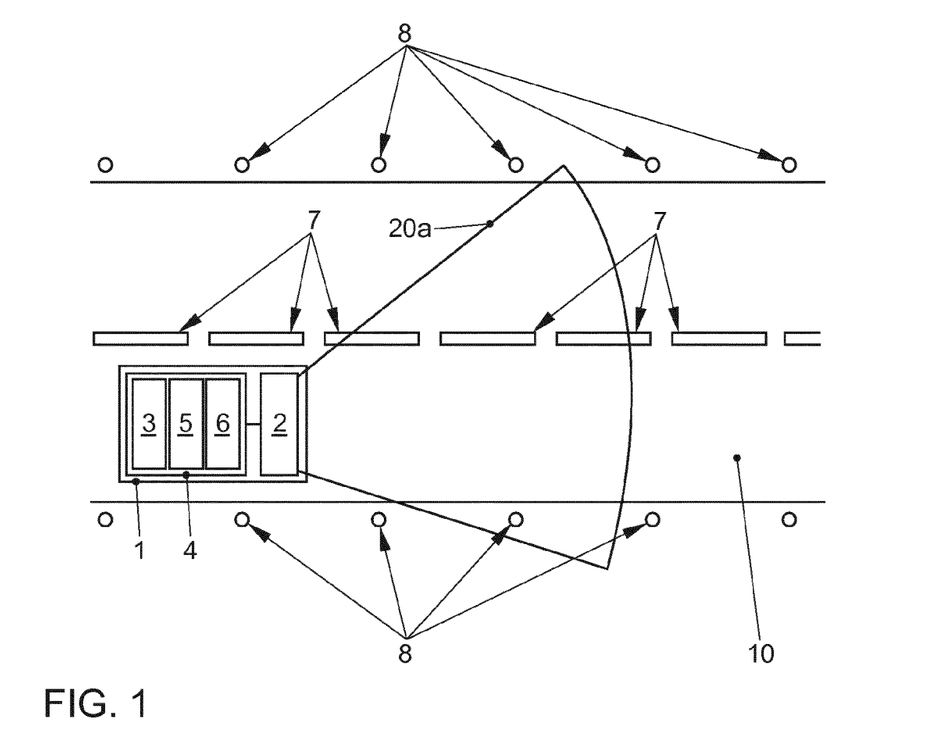
FIG. 1 shows a road with a vehicle that comprises an exemplary embodiment of the system according to the invention.

In this case, the exemplary embodiment of the system explained in the preceding with reference to FIG. 1 is assumed, as well as the exemplary embodiment of the method explained in the preceding with reference to FIG. 2A to 2E.

Figure 3A:
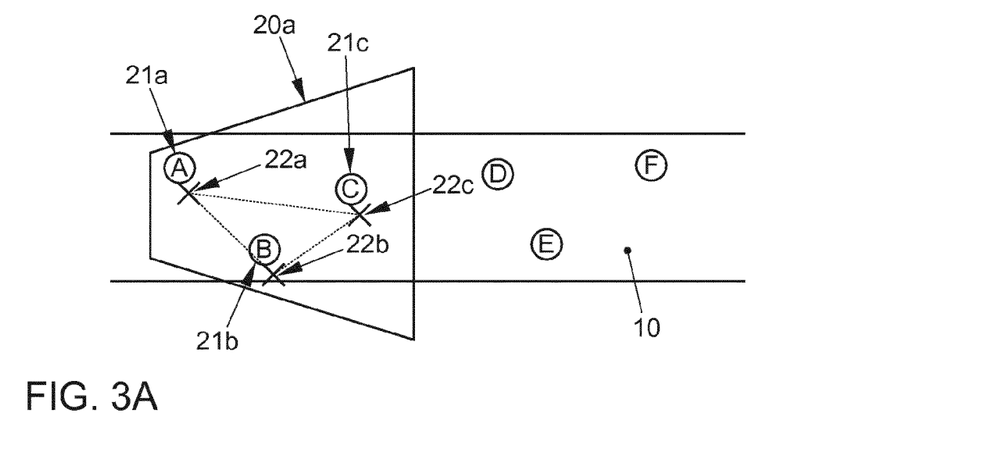
FIG. 3A to 3D show an exemplary embodiment with recorded relative positions of landmarks that were determined in an exemplary embodiment of the method according to the invention.
Figure 3B:
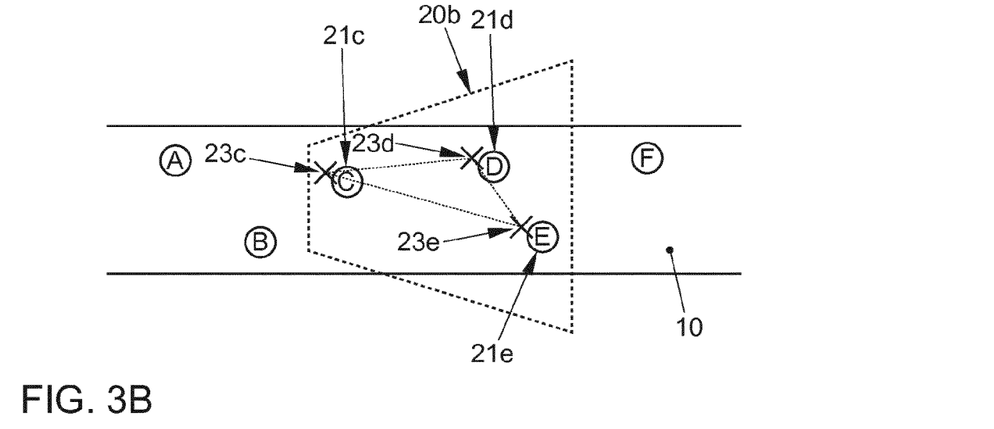
Figure 3C:
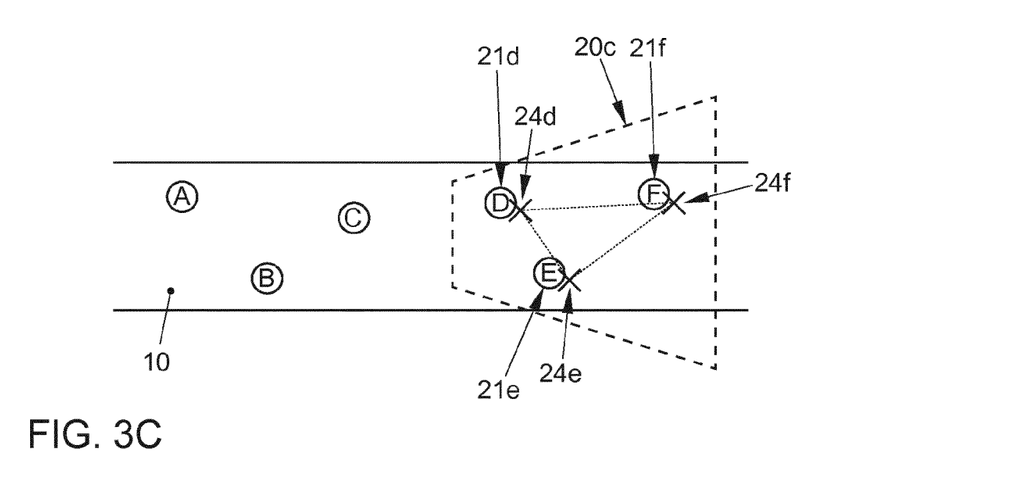

As shown above in FIG. 2B to 2D, measurement data sets at three sequential points in time are also recorded in the cases depicted in FIG. 3A to 3C while the vehicle 1 is moving on the road 10. The recording spaces 20a to 20c are correspondingly shifted relative to each other.

In this example, the determination of the reference position for the individual measurement data sets is associated with a statistical error, however. For this reason, the landmarks 21a, 21b, 21c, 21d, 21e, 21f are not recorded at their actual global positions. The shifting depicted in FIG. 3A to 3D is depicted very distinctly for reasons of clarity. At the same time, however, the spatial correlation between the landmarks 21a, 21b, 21c, 21d, 21e, 21f can be determined with great precision using the recorded measurement data sets so that this uncertainty is negligible in FIG. 3A to 3D.

For example, the landmarks "A", "B" and "C" (21a, 21b, 21c) in the case shown in FIG. 3A are recorded in the recording space 20a. The determined relative positions 22a, 22b, 22c relative to the relative point associated with a measuring error are shifted relative to the actual positions of the landmarks "A", "B" and "C" (21a, 21b, 21c). The spatial correlations depicted with dashed lines, however, are in this case recorded with great precision.

Analogously, FIGS. 3B and 3C show the recording of data and the determination of relative positions 23c, 23d, 23e, 24d, 24e, 24f in the other recording spaces 20b and 20c.

Figure 3D:
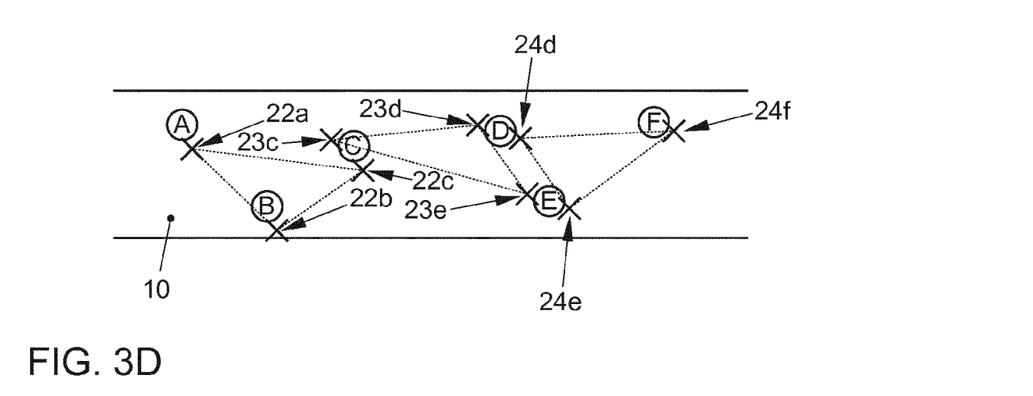

By means of the adjustment unit 6, the recorded relative positions 22a, 22b, 22c, 23c, 23d, 23e, 24d, 24e, 24f are combined as schematically depicted in FIG. 3D. Furthermore, the landmarks 21a, 21b, 21c, 21d, 21e, 21f are depicted here for better comprehension. It is now the task of the adjustment unit 6 to determine global positions of the landmarks 21a, 21b, 21c, 21d, 21e, 21f such that they correspond as precisely as possible to the real geographic positions of the landmarks 21a, 21b, 21c, 21d, 21e, 21f. For this purpose, a curve fit calculation is carried out, wherein the spatial correlations are introduced as secondary conditions. In particular, the spatial correlations are quantities (constraints) obtained in the curve fit calculation.

To understand the exemplary embodiment, first a model of the curve fit calculation will be explained described in a familiar manner, and then the enhancement by the present method will be explained.

The determined relative positions 22a, 22b, 22c, 23c, 23d, 23e, 24d, 24e, 24f of the landmarks 21a, 21b, 21c, 21d, 21e, 21f are associated with the imprecision in determining the determined reference position, in this example the vehicle position, and imprecisions in detection, i.e., such as the recording unit 2, the detection unit 3 and the computing unit 4, i.e., for example during image processing in calibration. In this case, the imprecision in detecting is much smaller than the additional imprecision in determining the determined reference position, such as by means of a GPS module. Relative positions 22a, 22b, 22c, 23c, 23d, 23e, 24d, 24e, 24f are thus determined that comprise each landmark 21a, 21b, 21c, 21d, 21e, 21f corresponding to the number of their detections accordingly.

The variances of each individual determined relative position 22a, 22b, 22c, 23c, 23d, 23e, 24d, 24e, 24f can be ascertained by variance propagation. In order to ascertain the global position of a landmark 21a, 21b, 21c, 21d, 21e, 21f which was repeatedly detected, geodesy frequently uses the "method of the least square". For example, a model with a linear functional relationship can be used. For this, the detections are first associated with each other, wherein it is determined which of the determined relative positions 22a, 22b, 22c, 23c, 23d, 23e, 24d, 24e, 24f is assigned to which landmark 21a, 21b, 21c, 21d, 21e, 21f. Methods known per se can be used for this. In the following, the curve fit calculation for the depicted exemplary embodiment will be constructed in a simple model in which the functional relationship between observation and the parameters to be estimated is linear. For this, in the context of the curve fit calculation according to the method of the least square, an observation vector 1 will be established which in this case consists of the X and Y coordinates of the determined relative positions 22a, 22b, 22c, 23c, 23d, 23e, 24d, 24e, 24f. Moreover, P describe the unknown parameter vector (the optimum positions), A the design matrix, and $\hat{x}$ the weight matrix (inverse of the covariance matrix $\Sigma_{ll}$):

$$\hat{x} = \begin{bmatrix} \hat{X}_{21a} \\ \hat{Y}_{21a} \\ \hat{X}_{21b} \\ \hat{Y}_{21b} \\ \vdots \end{bmatrix}, l = \begin{bmatrix} l_1 \\ l_2 \\ l_3 \\ l_4 \\ l_5 \\ l_6 \\ l_7 \\ \vdots \\ l_n \end{bmatrix} = \begin{bmatrix} X_{20a,21a} \\ Y_{20a,21a} \\ X_{20a,21b} \\ Y_{20a,21b} \\ X_{20a,21c} \\ Y_{20a,21c} \\ X_{20b,21c} \\ Y_{20b,21c} \\ \vdots \end{bmatrix},$$

$$A = \begin{bmatrix} 1 & 0 & 0 & 0 & 0 & 0 & \ldots \\ 0 & 1 & 0 & 0 & 0 & 0 & \ldots \\ 0 & 0 & 1 & 0 & 0 & 0 & \ldots \\ 0 & 0 & 0 & 1 & 0 & 0 & \ldots \\ 0 & 0 & 0 & 0 & 1 & 0 & \ldots \\ 0 & 0 & 0 & 0 & 0 & 1 & \ldots \\ 0 & 0 & 0 & 0 & 1 & 0 & \ldots \\ 0 & 0 & 0 & 0 & 0 & 1 & \ldots \\ \vdots & \vdots & \vdots & \vdots & \vdots & \vdots & \ddots \end{bmatrix}, P = \sum_{ll}^{-1}$$

The adjustment model for calculating the global positions for a linear functional relationship in this example is accordingly:

$$\hat{x} = (A^T P A)^{-1} A^T P l$$

In this manner, an adjustment is carried out for each landmark 21a, 21b, 21c, 21d, 21e, 21f that corrects the plurality of determined relative positions 22a, 22b, 22c, 23c, 23d, 23e, 24d, 24e, 24f for each individual landmark 21a, 21b, 21c, 21d, 21e, 21f.

According to the present discussion, this method is modified such that the previously determined spatial correlations are introduced as additional constraints in order to obtain the structure of the landmarks 21a, 21b, 21c, 21d, 21e, 21f relative to each other. The curve fit calculation offers different methods for incorporating conditions into the calculations. The procedure of retaining the spatial correlations in the curve fit calculation can be accomplished in several different ways, for example using a Gauss-Markov or Gauss-Helmert model. For the exemplary embodiment, one of the easier suitable methods will be explained as an example (Niemeier, Wolfgang (2008): Ausgleichungsrechnung. $2^{nd}$ edition Berlin: de Gruyter), wherein the observed distances between the landmarks of a measuring epoch are incorporated as fictive observations. In additional exemplary embodiments, other methods which are known per se can be used in order to take into account the spatial constraints in optimization.

In the exemplary embodiment, the above-described linear model is expanded as follows:

$$l_{expanded} = \begin{bmatrix} l \\ l_B \end{bmatrix}, A_{expanded} = \begin{bmatrix} A \\ A_B \end{bmatrix}, \sum_{expanded} = \begin{bmatrix} \sum_{ll} & 0 \\ 0 & \sum_{l_B l_B} \end{bmatrix},$$

wherein $$l_B = \begin{bmatrix} l_{B1} \\ l_{B2} \\ l_{B3} \\ l_{B4} \\ l_{B5} \\ l_{B6} \\ l_{B7} \\ \vdots \\ l_{Bn} \end{bmatrix} = \begin{bmatrix} \Delta X_{20a,21a}^{20a,21b} \\ \Delta Y_{20a,21a}^{20a,21b} \\ \Delta X_{20a,21b}^{20a,21c} \\ \Delta Y_{20a,21b}^{20a,21c} \\ \Delta X_{20a,21a}^{20a,21c} \\ \Delta Y_{20a,21a}^{20a,21c} \\ \Delta X_{20b,21c}^{20b,21d} \\ \Delta Y_{20b,21c}^{20b,21d} \\ \vdots \end{bmatrix},$$

$$A = \begin{bmatrix} -1 & 0 & 1 & 0 & 0 & 0 & \cdots \\ 0 & -1 & 0 & 1 & 0 & 0 & \cdots \\ 0 & 0 & -1 & 0 & 1 & 0 & \cdots \\ 0 & 0 & 0 & -1 & 0 & 1 & \cdots \\ -1 & 0 & 0 & 0 & 1 & 0 & \cdots \\ 0 & -1 & 0 & 0 & 0 & 1 & \cdots \\ 0 & 0 & 0 & 0 & -1 & 0 & \cdots \\ 0 & 0 & 0 & 0 & 0 & -1 & \cdots \\ \vdots & \vdots & \vdots & \vdots & \vdots & \vdots & \ddots \end{bmatrix}, P = \sum_{u}^{-1}.$$

As a formula, the above-cited calculation of the global positions remains unchanged:

$$\hat{x} = (A^T P A)^{-1} A^T P l$$

The method according to the present discussion clearly corrects uncertainties in the determined relative positions 22a, 22b, 22c, 23c, 23d, 23e, 24d, 24e, 24f in that an optimum global position for the landmark 21a, 21b, 21c, 21d, 21e, 21f is determined using a plurality of relative positions 22a, 22b, 22c, 23c, 23d, 23e, 24d, 24e, 24f belonging to a landmark 21a, 21b, 21c, 21d, 21e, 21f. In doing so, it is however taken into account in that the spatial correlations between the determined relative positions 22a, 22b, 22c, 23c, 23d, 23e, 24d, 24e, 24f should remain as constraints, or only very slight deviations are permitted.

In the example depicted in FIG. 3D, this would, for example, cause the determined relative positions 22a, 22b, 22c, 23c, 23d, 23e, 24d, 24e, 24f to shift, wherein the relative positions 22a, 22b, 22c, 23c, 23d, 23e, 24d, 24e, 24f which are "associated" by the spatial correlations are basically shifted together.

In further exemplary embodiments, the measurement data sets recorded by the vehicle 1 are transmitted to an external apparatus and processed there, in particular together with the recorded positions of the vehicle 1, or with the data of the GPS module of the recording unit 2. In this case, the external apparatus can also comprise the computing unit 4, the detection unit 3, the correlation unit 5, and/or the adjustment unit 6. The external apparatus can for example be a server or a computing device.

Using the determined global positions, map data can be generated or updated. This can be accomplished using an apparatus of the vehicle 1, or by means of an external apparatus such as a server. These map data can be transmitted to another vehicle which then can determine its own position on the road 10 using the map data with the global positions of the landmarks 21a, 21b, 21c, 21d, 21e, 21f. In this case, the map data can be saved by the vehicle 1 itself, or they can the transmitted as needed to the vehicle 1, for example in response to a request from the vehicle 1, by an external server.

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

REFERENCE NUMBER LIST

1 Vehicle
2 Recording unit
3 Detection unit
4 Computing unit
5 Correlation unit
6 Adjustment unit
7 Road markers
8 Posts; guideposts
10 Road
20a, 20b, 20c Recording spaces
21a, 21b, 21c, 21d, 21e, 21f Landmarks A, B, C, D, E, F (actual global positions)
22a, 22b, 22c First relative positions
23c, 23d, 23e Second relative positions
24d, 24e, 24f Third relative positions

What is claimed is:

1. A method for determining a global position of a first landmark, wherein
   at least one first and one second measurement data set are recorded; wherein
   a first reference point and a first recording space are assigned to the first measurement data set, and a second reference point and a second recording space are assigned to the second measurement data set;
   the first landmark is detected in the first and second recording space, and a second landmark, different from the first landmark, is detected in the first recording space;
   by using the first measurement data set, first relative positions of the first and the second landmark are determined relative to the reference point of the first recording space; and
   by using the second measurement data set, a second relative position of the first landmark is determined relative to the reference point of the second recording space;
   a spatial correlation of the first and second landmark relative to each other is determined as a vector between the determined first relative positions using the first measurement data set; and
   the global position of the first landmark relative to a global reference point is determined by using the determined first and second relative position of the first landmark, by using the determined first relative position of the second landmark, and by using the determined spatial correlation; wherein
   the global position of the first landmark is determined by means of a curve fit calculation; and
   the determined spatial correlation is used as a constraint for the curve fit calculation.

2. The method according to claim 1, wherein the landmarks comprise a road marker, a post and/or an edge.

3. The method according to claim 1, wherein a point in time is assigned to each measurement data set.

4. The method according to claim 1, wherein a plurality of measurement data sets is recorded sequentially over time, wherein the recording spaces assigned to the measurement data sets are shifted relative to each other along a trajectory.

5. The method according to claim 1, wherein the measurement data sets comprise distance information and/or image data.

6. The method according to claim 1, wherein the global reference point is a position of a location on the Earth's surface.

7. The method according to claim 1, wherein using the determined global position, map data are generated or updated.

8. The method according to claim 1, wherein the determined spatial correlation comprises a distance and/or an angle.

9. The method according to claim 1, wherein a second global position is determined for the second landmark by means of the curve fit calculation.

10. A system for determining a global position of a first landmark with a recording unit, using which at least one first and one second measurement data set can be recorded, wherein a first reference point and a first recording space are assigned to the first measurement data set, and a second reference point and a second recording space are assigned to the second measurement data set; wherein the system further comprising a computing unit, configured to:

detect the first landmark in the first and second recording space, and a second landmark, different from the first landmark, in the first recording space;

determine, by using the first measurement data set, first relative positions of the first and the second landmark relative to the reference point of the first recording space, and by using the second measurement data set, determine a second relative position of the first landmark relative to the reference point of the second recording space;

determine a spatial correlation of the first and second landmark relative to each other as a vector between the determined first relative positions using the first measurement data set; and determine the global position of the first landmark relative to a global reference point using the determined first and second relative position of the first landmark, the determined first relative position of the second landmark, and the determined spatial correlation; wherein the computing unit is further configured to determine the global position of the first landmark by means of a curve fit calculation; wherein the determined spatial correlation is used as a constraint for the curve fit calculation.

11. The system according to claim 10, wherein the recording unit comprises a time-of-flight camera, a mono camera, a stereo camera, a lidar device and/or a radar device.

12. The system according to claim 10, wherein the system is comprised by a vehicle, wherein a position of the vehicle can furthermore be recorded for each measurement data set, and the respective recorded position of the vehicle is assigned to the respective measurement data set as a reference point.

13. The method according to claim 11, wherein a second global position is determined for the second landmark (21a, 21b) by means of the curve fit calculation.

14. The system according to claim 11, wherein the system is comprised by a vehicle, wherein a position of the vehicle can furthermore be recorded for each measurement data set, and the respective recorded position of the vehicle is assigned to the respective measurement data set as a reference point.

* * * * *